(12) United States Patent
Fascenda et al.

(10) Patent No.: US 10,050,943 B2
(45) Date of Patent: Aug. 14, 2018

(54) WIDELY DISTRIBUTED PARAMETERIZATION

(71) Applicant: Protected Mobility, LLC, Rockville, MD (US)

(72) Inventors: Anthony C. Fascenda, Leland, NC (US); Emil Sturniolo, Medina, OH (US)

(73) Assignee: Global Integrity, Inc., McLean, VA (US)

(*) Notice: Subject to any disclaimer, the term of this patent is extended or adjusted under 35 U.S.C. 154(b) by 73 days.

(21) Appl. No.: 15/044,796

(22) Filed: Feb. 16, 2016

(65) Prior Publication Data

US 2016/0241524 A1    Aug. 18, 2016

Related U.S. Application Data

(60) Provisional application No. 62/116,162, filed on Feb. 13, 2015.

(51) Int. Cl.
*H04L 29/06* (2006.01)
*H04L 9/08* (2006.01)

(52) U.S. Cl.
CPC ........ *H04L 63/0428* (2013.01); *H04L 9/0819* (2013.01); *H04L 9/0866* (2013.01); *H04L 63/06* (2013.01); *H04L 9/0863* (2013.01); *H04L 63/0435* (2013.01); *H04L 63/0442* (2013.01)

(58) Field of Classification Search
CPC . H04L 63/06; H04L 63/0428; H04L 63/0442; H04L 63/0435; H04L 9/0819; H04L 9/0866; H04L 9/0863
See application file for complete search history.

(56) References Cited

U.S. PATENT DOCUMENTS

| | | | |
|---|---|---|---|
| 8,751,804 B1* | 6/2014 | Nystrom | H04L 63/0428 713/168 |
| 9,171,145 B2* | 10/2015 | Dash | G06F 21/44 |
| 9,246,686 B1* | 1/2016 | Holland | H04L 9/3236 |
| 9,639,710 B2* | 5/2017 | Cooley | G06F 21/6218 |

* cited by examiner

*Primary Examiner* — Beemnet Dada
(74) *Attorney, Agent, or Firm* — Nixon & Vanderhye P.C.

(57) ABSTRACT

This technology mitigates the vulnerabilities of parameter storage by calculating parameters dynamically rather than storing and using static parameters. This example non-limiting technology derives parameters "on-demand" from a subset of widely distributed parameters determined by a random string generated for each encrypted session. The subset of widely distributed parameters will be different each time a new subset is generated as the individual parameters are randomly selected. Thus the individual encrypted message (or document) will be encrypted differently using a different set of parameters each time. Some of these parameters bind the encrypted message to a specific user account and user device making the resulting encrypted message highly secure.

16 Claims, 16 Drawing Sheets

WIDELY DISTRIBUTED PARAMETERIZATION

CROSS-REFERENCE TO RELATED APPLICATIONS

This application claims the benefit of U.S. Provisional Patent Application No. 62/116,162 filed Feb. 13, 2015, incorporated herein by reference.

STATEMENT REGARDING FEDERALLY SPONSORED RESEARCH OR DEVELOPMENT

None.

FIELD

The technology herein relates to the field of message encryption. More specifically, the non-limiting technology herein comprises a set of widely distributed parameters that are used to derive the encryption parameters for a message.

BACKGROUND

Account management and in particular, key management, are useful parts of any security system. Key distribution, revocation, etc., are often complex and difficult aspects of any encryption system. Typically, encryption parameters are stored securely on the user's device and are generally static; that is, they do not change from one message to the next. Encryption keys are often distributed from a central location via an IT Administrator and provide the basis for encryption/decryption services on the user's device.

Typical encryption systems rely on a few basic parameters such as the account name and password, encryption key, encryption salt, initialization vector, etc. These parameters are typically stored on the client device. Some of these parameters such as the account name and password and the encryption key are generally static. The object of any intercept of secured traffic therefore is to capture the key and its various parameters. Once captured, all of the previous and future encrypted traffic are readily available.

It would be desirable to develop a system that can make it unlikely for such attacks to succeed.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EMBODIMENTS

The example non-limiting technology herein relies on a hardware device that binds a software application on the user's device to the external hardware device such that the application will not operate outside the presence of the hardware device.

One non-limiting aspect of the example technology herein utilizes a widely dispersed set of parameters which uniquely identify the user and the user's device. Such parameters may include among other things the user's device serial number, the user's account number and other parameters provided by a Registration Server. These parameters are used to derive the necessary encryption components rather than utilizing a pre-distributed and pre-stored static key. The number of parameters identifying the user and the user's device can be large and not every parameter is used every time to identify the user. Each time the user authenticates, a random selection of the widely dispersed parameters is chosen at that particular instant to identify the user and the user's device.

Another non-limiting aspect is that each time a message or document is encrypted, a unique selection of parameters is chosen to generate the specific encryption components (key, iv, key size, hash type, etc.) from a generated Encryption Parameter Table to utilize in encrypting a message.

An example non-limiting embodiment comprises a server for managing user registrations and a client software module for encrypting/decrypting messages and files.

Other non-limiting features and advantages include:
A method of encryption/decryption not involving or requiring the use of a key-exchange.
A method of utilizing a wide and diverse set of parameters to derive on-demand a symmetric key for encrypting a message or document.
A method of utilizing a wide and diverse set of parameters that results in an encrypted message being bound to a particular user's account and user's device.
A method of encryption/decryption where a stored symmetric key is not required.

A method of generating an Encryption Parameter Table from one of a set of passphrases resulting in a table from which a very large number (>1,000,000 possible combinations could result for any specific message).

A method which uses a randomly generated string to select specific parameters from an Encryption Parameter Table.

Example Detailed Non-Limiting Implementation

Figure 1:
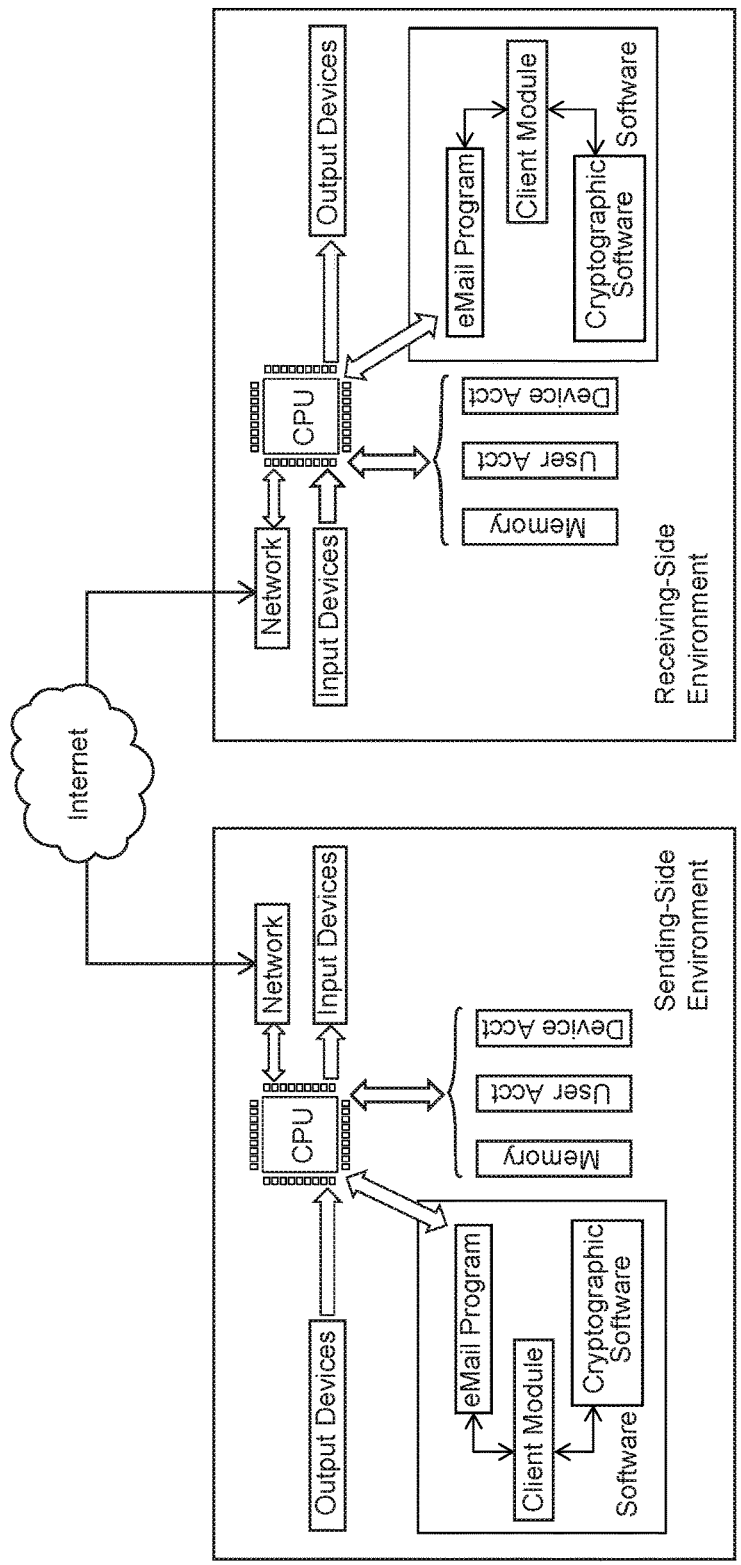
FIG. 1 shows a basic schema of a communications environment between a sending side and a receiving-side environment.

As seen in FIG. 1, client-side software provides the mechanism for calculating encryption parameters for specific applications such as e-mail, word-processing, spreadsheets and presentations to encrypt their message/file traffic for secure distribution to intended recipients.

In the FIG. 1 example, a sending-side environment communicates over a communications network with a receiving-side environment. The sending-side environment and receiving-side environments each may comprise computing environments based on any kinds of computing devices such as personal computers, embedded processing systems, smart phones, tablets, wearable computers, handheld computers, or any other computing platforms. The communications network can similarly comprise any type of communications arrangement including cellular telephone network(s), local area network(s), the Internet, short range communications such as Bluetooth or NFC, or any other type of wired or wireless communications.

In the example shown, each environment comprises a CPU, a network adapter; input devices such as touch screen, keyboards, microphones or the like; output devices such as displays, speakers or the like; memory (flash, disk, RAM, ROM, etc.); account data storage and a software and/or hardware based encryption element. In some examples, the encryptor and decryptor can comprise processors executing encryption (decryption) cryptographic software that cooperates with a client module and an application such as for example an email program. The cryptographic software may be stored in one or more non-transitory memory devices. In other implementations, the cryptographic functionality can be provided by hardware, programmed logic circuitry, or by any combination of hardware and software. Each such environment may store information relating to a user account and information relating to a device account.

The client-side software, typically in the form of a software module, routine or subroutine, automatically encrypts/decrypts messages and files without user intervention. On sending a message or saving/attaching a file to a message, the module generates an Encryption Parameter Table based on a randomly chosen set of parameters from the collection of widely dispersed parameters. The Encryption Parameter Table contains a number of encryption keys, initialization vectors, salts, etc., generated using an enterprise-specified algorithm that generates the table from the unique selection of parameters. A random string is then generated which is used to select specific encryption parameters from the Encryption Table. These parameters along with other parameters selected from the collection of widely dispersed parameters are processed to generate a file_lock_key used to encrypt/decrypt the message or file.

Symmetric-key algorithms—variations of which have been used for thousands of years—use a single secret key, which must be shared and kept private by both the sender and the receiver, for both encryption and decryption. To use a symmetric encryption scheme, the sender and receiver must securely share a key in advance.

Because symmetric key algorithms are nearly always much less computationally intensive than asymmetric ones, it is common to exchange a key using a key-exchange algorithm, then transmit data using that key and a symmetric key algorithm. PGP and the SSL/TLS family of schemes use this procedure, and are thus called hybrid cryptosystems. One example non-limiting feature eliminates key exchange altogether. An additional non-limiting feature generates the encryption key using a set of widely dispersed parameters some of which are tied to the user's account and some to the user's device. A further non-limiting feature derives a symmetric encryption key or asymmetric key pair from a set of parameters from multiple tables based on a randomly generated strings such that it cannot be known beforehand which set of widely dispersed parameters might be chosen to derive said encryption key.

Figure 2:
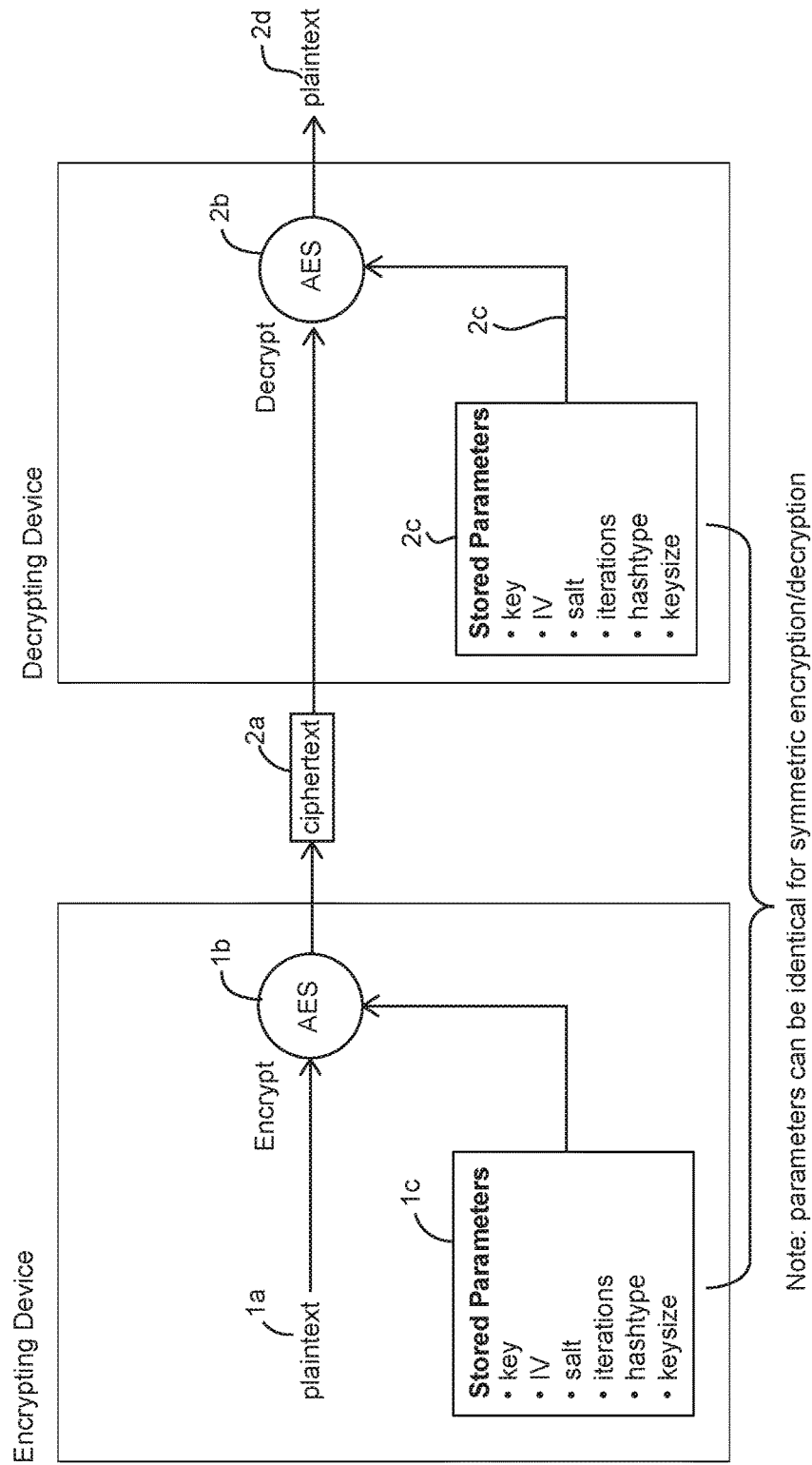
FIG. 2 shows a basic schema of a symmetric-key algorithm using (for example, but not limited by) 256-bit AES (Advanced Encryption Standard).

As seen in FIG. 2, typical AES encryption (1b, 2b) utilizes a stored set of identical encryption parameters (1c, 2c) on both the encrypting and decrypting devices permitting the secure exchange of information. This stored set of encryption parameters can be built into the actual software embedded in the module as delivered to the end-user or it may be installed from any secure means such as an e-mail message, downloaded from an enterprise server or, for example, via a hardware token. Embedding the information is one illustrative embodiment, but other implementations to access this information can be easily envisioned by those schooled in the art.

Figure 4:
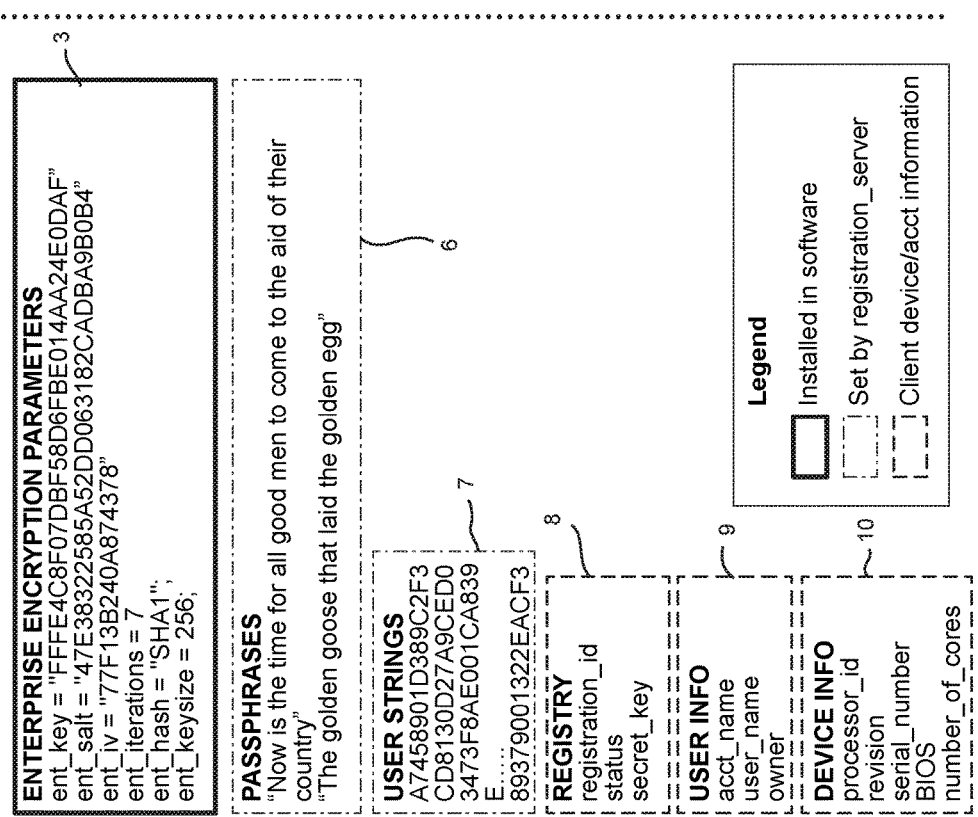
FIG. 4 illustrates by example some parameters that might form part of the widely dispersed parameter set.

A description of the parameter locations to be utilized are shown in FIG. 4. A series of parameters are involved beginning with the Enterprise Encryption Parameters (3) embedded in the software prior to delivery to enterprise clients. These parameters have the form shown in item (3). These parameters include a specifically tailored key, salt, iv, hash type, iteration count and key size. These parameters are common among all client software installations and the registration server.

A set of Passphrases (6) will be received during the Registration process from the Registration Server (26) to be described later. Passphrases are typically plaintext phrases of any type and length although practically, their length would be greater than 32 characters and less than 512 characters. Passphrases are generally in natural language format but could consist of any character values.

User Strings (7) are plaintext strings that are received from the Registration Server (26) during the Registration process to be described later.

The system Registry (8) (Windows systems, Keychain for Apple IOS) holds values generated during the Registration process. The Registry will hold values for the registration_id and others to be subsequently described.

User information (9) is typically found in the Registry and contains such information as the account name, owner, user name, etc. This information is specific to each user. The specific elements of the User Information (8) can be retrieved using standard system function calls.

Similarly, Device information (10) can be obtained using standard system function calls to the operating system, BIOS and/or firmware for such parameters as the processor_id, revision, serial_number, BIOS, number_of_cores, etc. This information would be device-specific. Additional information can be utilized using an Environment function call to retrieve the user's specific environment, thus distinguishing one user of the same system or processor from another user.

It is these combination of parameters that will be used to derive a specific one-time encryption key to encrypt a specific piece of information. The receiving side in conjunction with the server will be likewise able to derive, not exchange, the necessary information to decrypt said encrypted information.

Registration Process

Step 1: Generating the registration_id.

Figure 5:
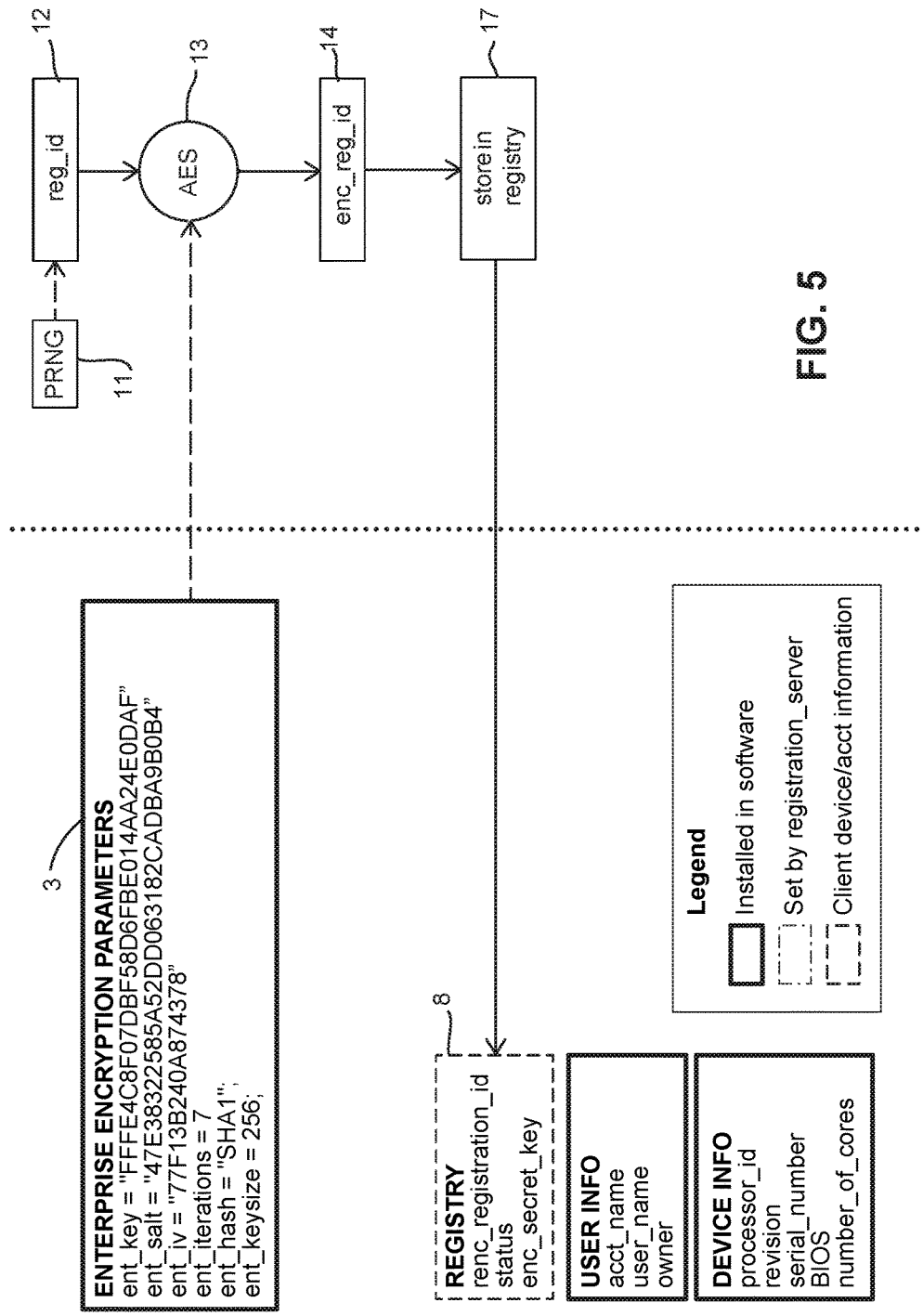
FIG. 5 illustrates a first step in the registration process.

As seen in FIG. 5, a Pseudo Random Number Generator (PRNG) (11) is used to generate a "registration_id" (12) that will uniquely identify the client in all subsequent communications. Optionally, the algorithm can select random input from the user physical environment such as mouse movements, accelerometer data (shaking the device), etc., to provide the initial seed to the PRNG. Note that this registration_id (12) will be unique to the user's particular device and will be different for each device the user maintains.

The registration_id is encrypted using an encryption algorithm (13) obtaining the necessary encryption parameters from the Enterprise Encryption Parameter table (3) embedded in the software. The encrypted registration_id (16) is now stored (17) in the registry (8). The registration_id cannot be obtained from the registry location without further knowing the Enterprise Encryption Parameters (3).

Step 2: Registering with the Server

Figure 3:
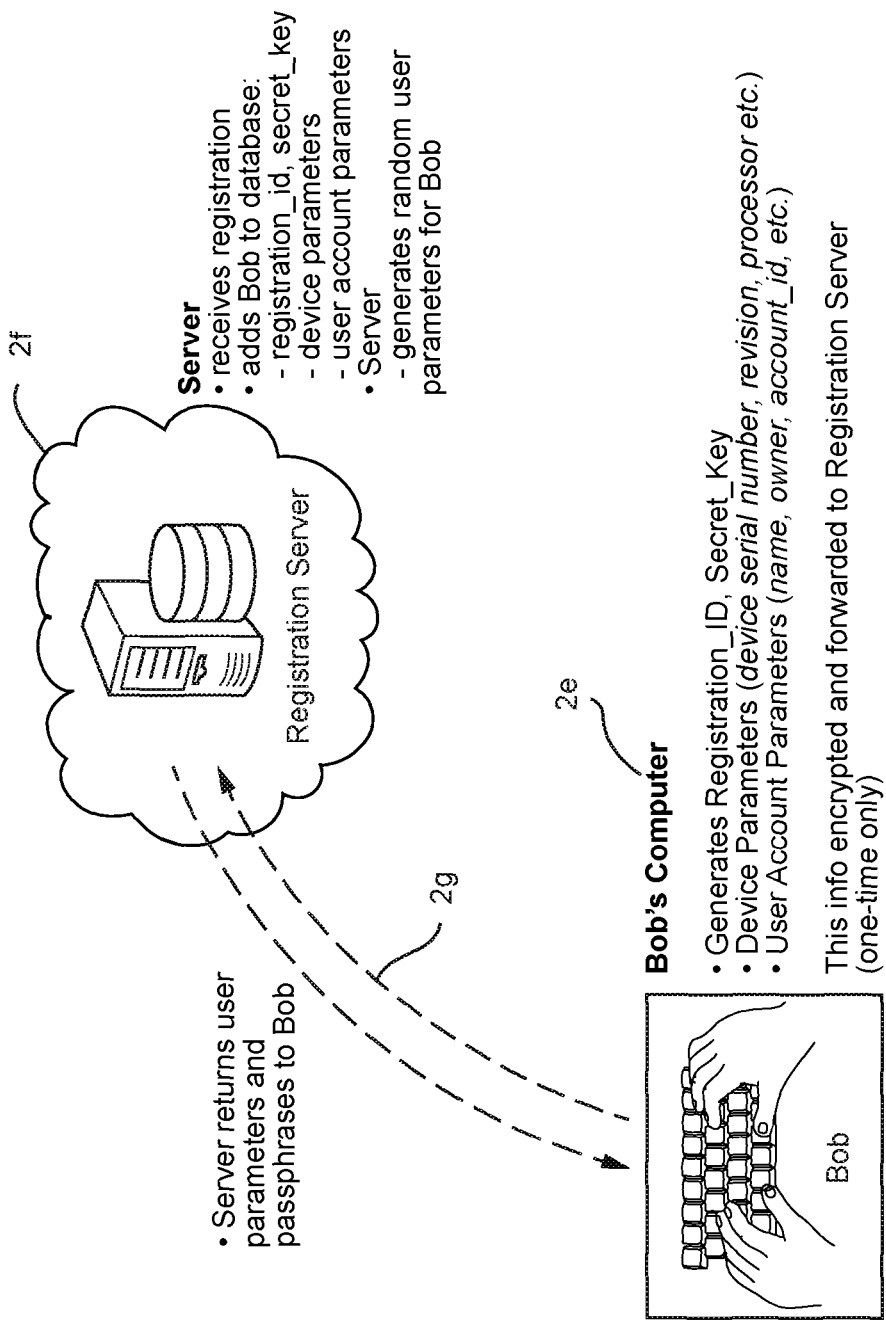
FIG. 3 shows steps involved in registering a new user on the server.

As seen in FIG. 3, the client computer (in this case "Bob's Computer, 2e), generates an initial Registration Message which is sent to the Registration Server (2f). The Registration Server adds "Bob" to the Registration Database using the registration_id as its key. The Registration Server (2f) now generates a random set of User Strings and returns them to the user (2g) along with the set of passphrases to be used in client transactions.

Figure 6:
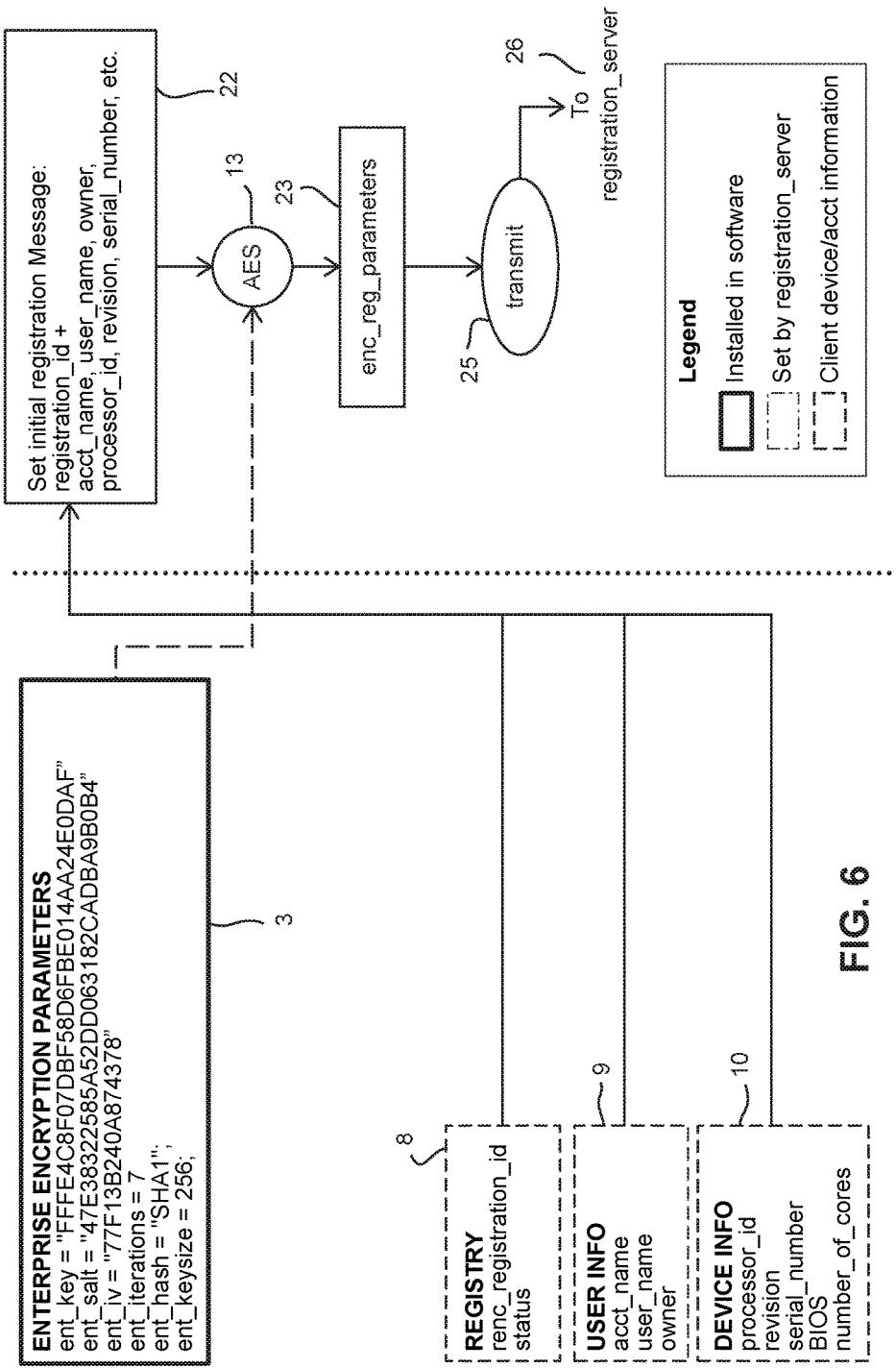
FIG. 6 illustrates the first step in a registration process wherein an initial registration message (22) is constructed using randomly selected parameters from the widely dispersed parameter collection.
Figure 7:
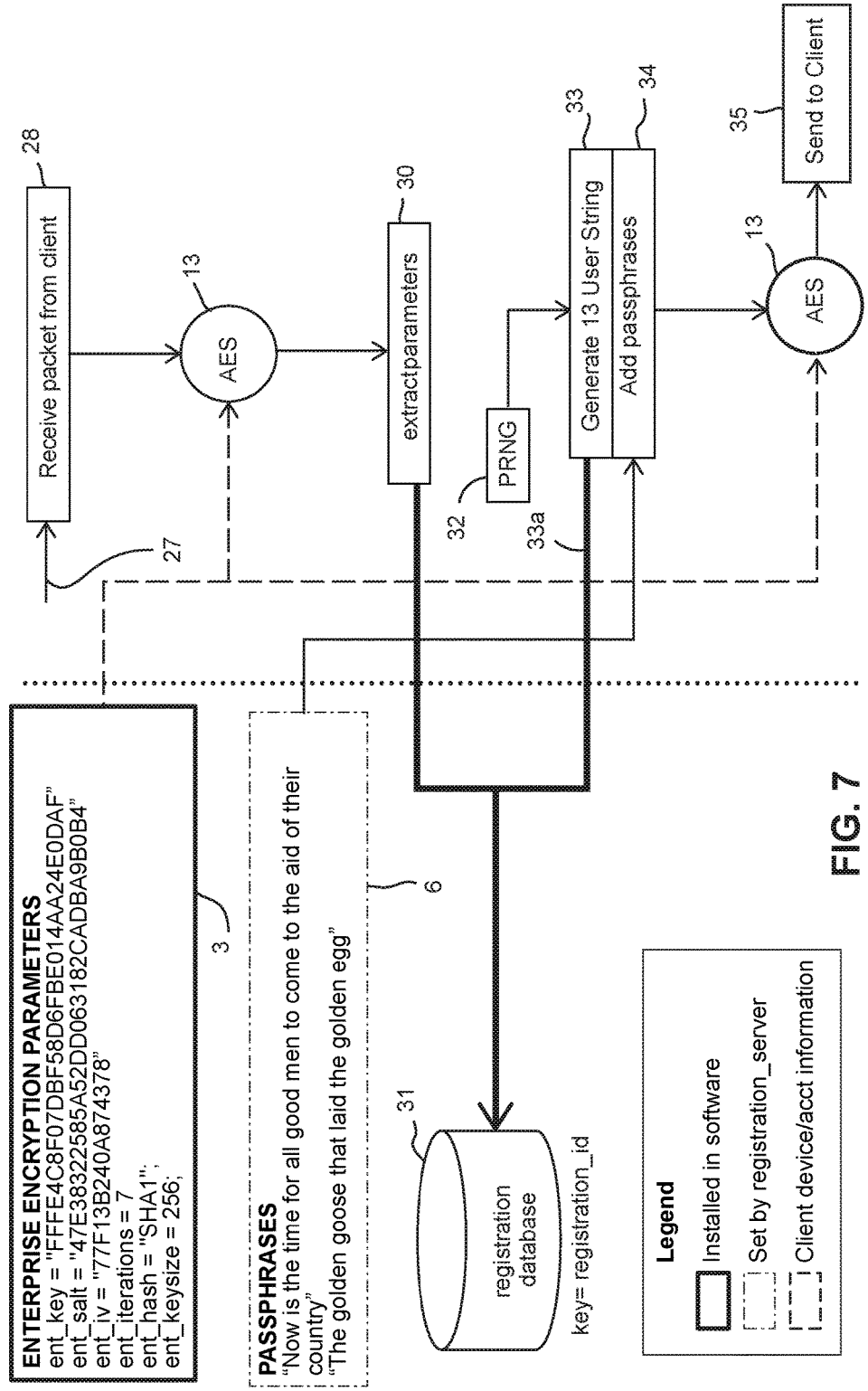
FIG. 7 illustrates Step 2 of the Registration Process.

The client generates an initial Registration Message (22) as seen in FIG. 6. All of the relevant user account (9) and device-specific information (10) is concatenated along with the registration_id. This initial registration message (22) is then encrypted (13) using the Enterprise Encryption parameters (3) embedded within the client software. The resulting encrypted registration parameters (24) are sent (25) to the registration server (26) via ordinary means.

On receipt of the registration packet (27) from the client, the packet (28 is then decrypted (13) using the Enterprise Encryption Parameters (3). The resulting plaintext is then processed (30) to extract all of the concatenated registration parameters. These parameters are now stored in the registration database (31) using the registration_id as the key. The registration database (31) now contains a record of all of the client parameters for a specific account and device. Multiple client devices for the same user will have separate entries in the database, one for each device.

If the client module detects any change in its registered parameters, the client module will automatically re-register its current set of parameters with the registration server using a new registration_id thus allowing messages previously encrypted with previous parameters to be addressed by the server along with new messages based on new parameters.

The registration server maintains a list of passphrases (6). These passphrases (6) are distributed to each registered client. A user interface allows an administrator to input, modify, delete as needed each passphrase. There is no limit to the number of passphrases allowed per enterprise but practical considerations would set the maximum number to about 64.

The registration server now returns a response packet to the client. The PRNG (33) is utilized to generate the User Strings. Each User String is a plaintext string of arbitrary length. The 13 User Strings (33) are concatenated along with the passphrases (34) and then encrypted (13) using the AES algorithm with the Enterprise Encryption Parameters (3). The ciphertext output of the AES (13) is re returned to the client (35).

Step 3: Processing Server Registration Response

Figure 8:
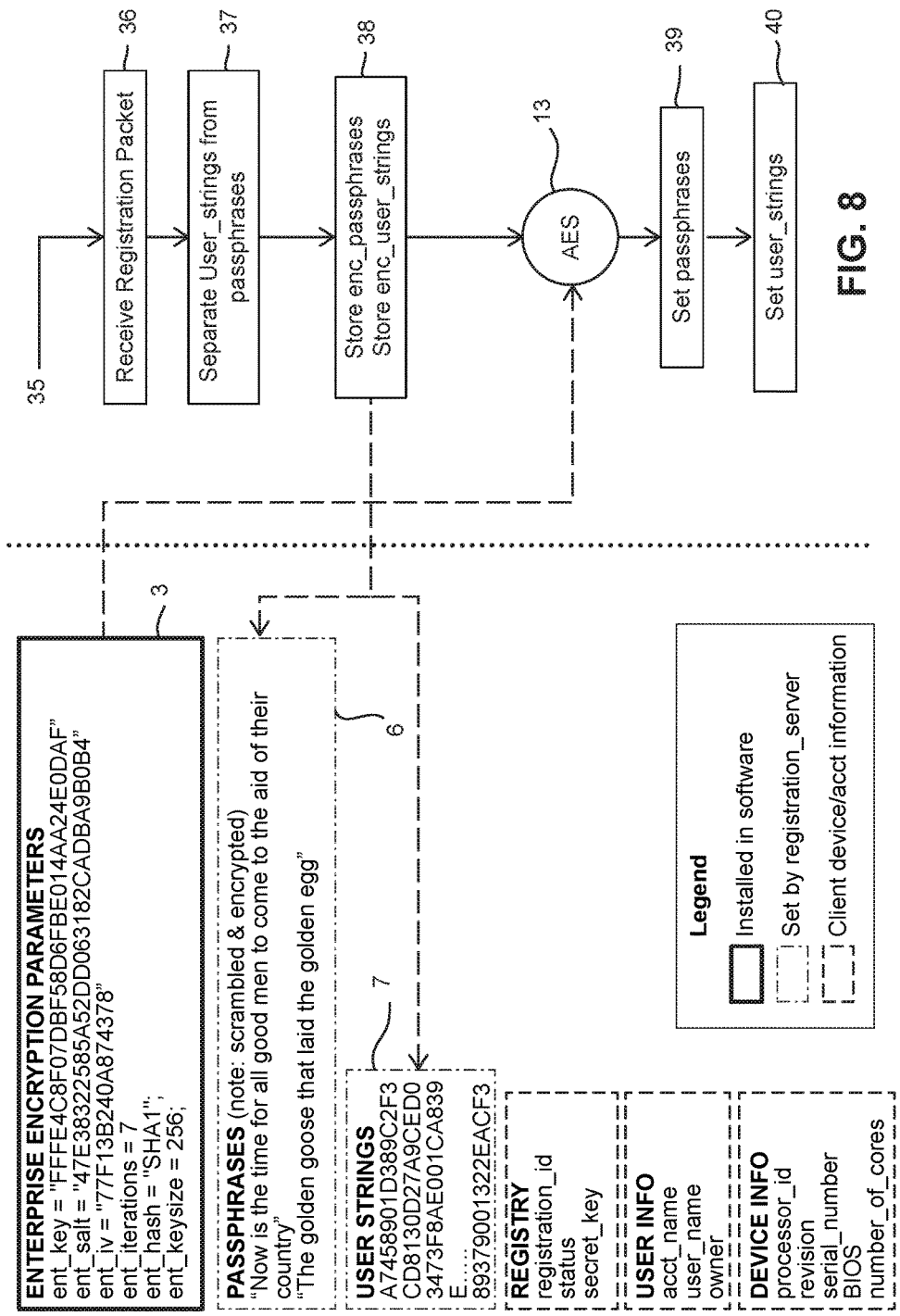
FIG. 8 illustrates the third and final step of the Registration process.

As shown in FIG. 8, the server registration response packet (35) is received by the client (36) and the encrypted strings (one for user strings and one for passphrases) are separated (37). These strings are then stored as received (38) in the appropriate locations (6 and 7).

Each encrypted string is now decrypted (13) using the Enterprise Encryption Parameters (3). The passphrases are now separated (39) as are the User Strings (40) and are available for use. Whenever the client software is re-started (38a), the encrypted passphrases and user strings are retrieved (38b) and then decrypted (13) and made ready for use (39, 40).

Encrypting a Message or Document

Figure 9:
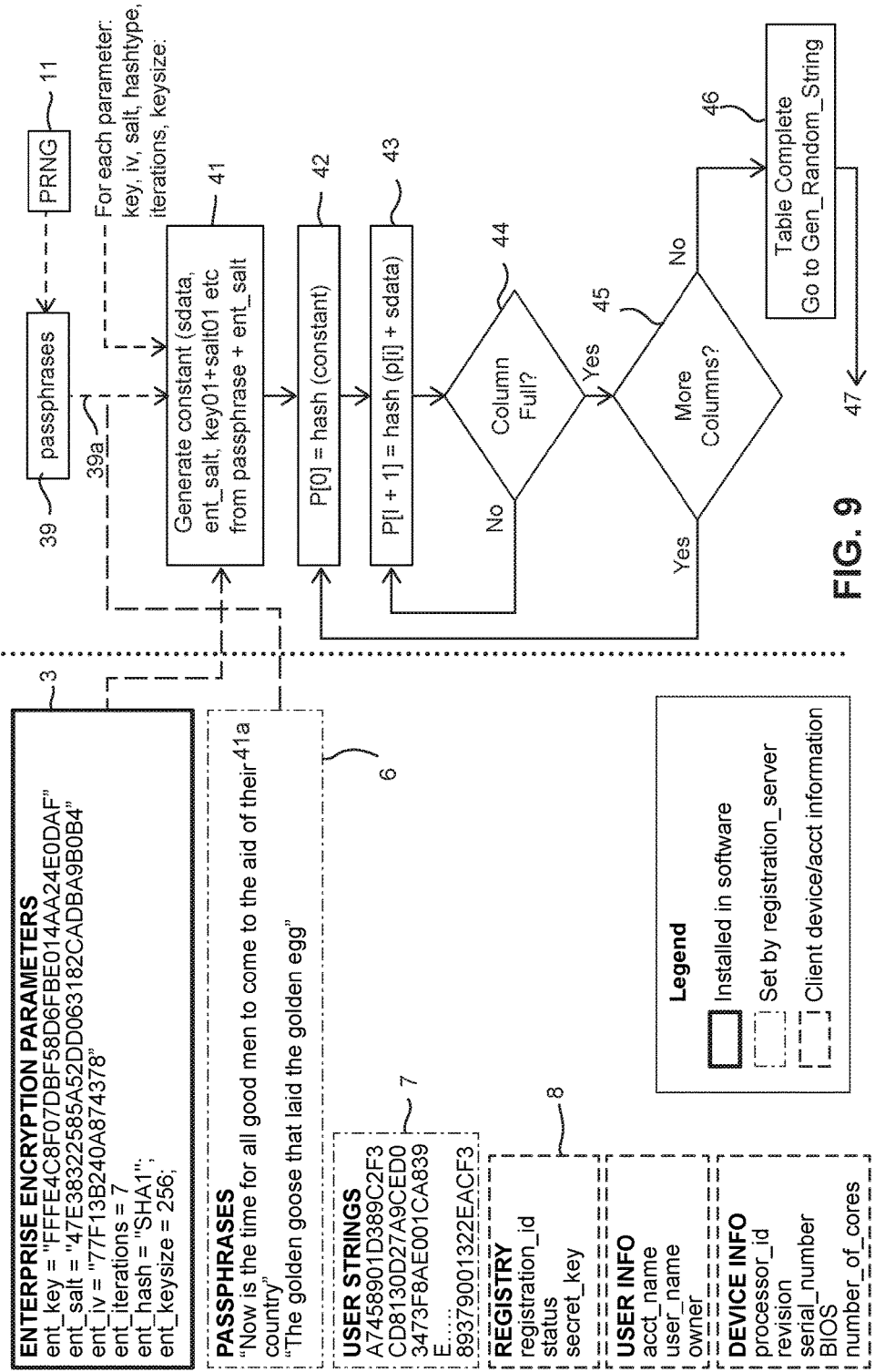
FIG. 9 illustrates the generation of a Parameter Table from the information received from the registration server. When encrypting a message or document using AES encryption, for example, certain parameters are used by the encryption algorithm These parameters are stored in a Parameter Table (49).

Whenever a message or document needs to be encrypted, the process begins as shown in FIG. 9. A Parameter Table (46) is generated containing a list of encryption keys, a list of encryption IVs, 26 salts, a list of hash types, a list of iteration counts and a list of key sizes. The table is filled column-by-column by the following process.

A PRNG (11) is used to randomly select one passphrase (39a) from the passphrases (39). For each parameter list in the table, the column is filled by generating a constant (sdata) (41) obtained by hashing the passphrase (39a). The first entry in the column for each parameter is made by hashing the constant (41). Subsequent entries (43) are made by hashing the concatenation of the previous entry and the constant (41). The process continues until the column is complete (44). On completion of one column (44), the next column process begins (42, 43, 44). When the table is fully populated (46), the next step is to generate the random_string (47).

Figure 10:
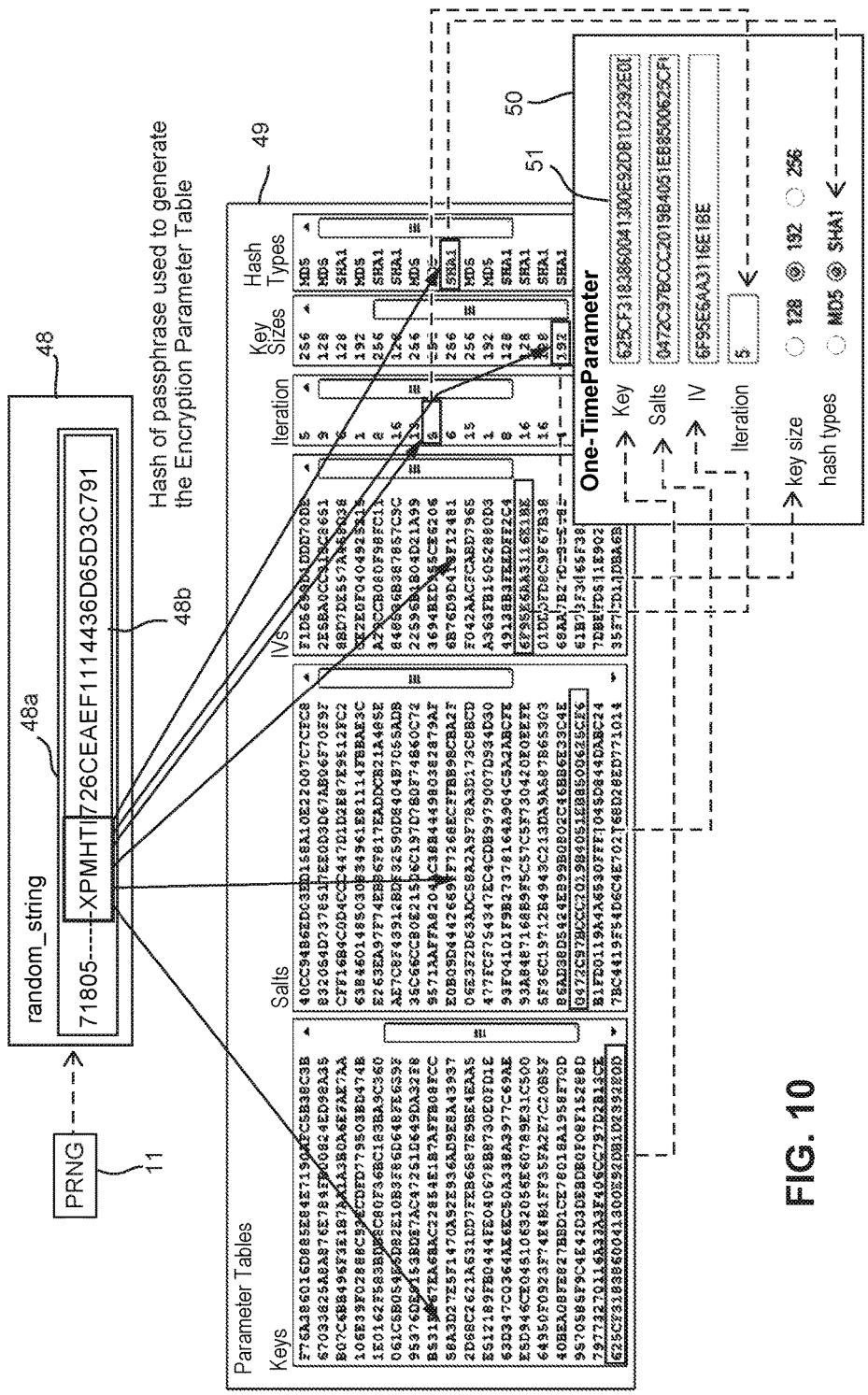
FIG. 10 illustrates the generation of a random string (48) and how it is used to select specific parameters from the Parameter Table (49) for use for encrypting a message or document (50, 51).

Now that the Parameter Table has been generated, a random_string (48) is generated using a PRNG (11). A substring (48a) of the random_string (48) contains alphanumeric characters which are used as pointers to each of the columns in the Parameter Table (49). FIG. 10 illustrates one example of the generation of a random string (48) and how it is used to select specific parameters from the Parameter Table (49) for use for encrypting a message or document (50, 51) using AES encryption. As the random string selects a random set of parameters and the number of parameters is very large, the parameter set randomly selected for encrypting a given message or document would not be expected to be used again during the lifetime of the application. A portion of a randomly generated string (48a) is used to select a specific set of parameters from the parameter table (49). These selected parameters are then used as the input to a further process that generates an actual encryption key to be shown in FIG. 11.

In the case shown in FIG. 10, the sub-string (48a) consists of "XPMHTI". Each letter is used to select one entry from each column in the Parameter Table (49). The selected parameters are illustrated graphically as "One Time Parameters" (50). Of particular importance is the one-time parameter "key" chosen from the "Keys" column of the Parameter Table. The utilization of this key will be shown when FIG. 13 as discussed. The passphrase (41a) utilized to generate the Encryption Parameter Table (49) is hashed and this hash is embedded in the random_string (48b). This hash allows for the decrypting client to determine which passphrase was used to create the Encryption Parameter.

Figure 11:
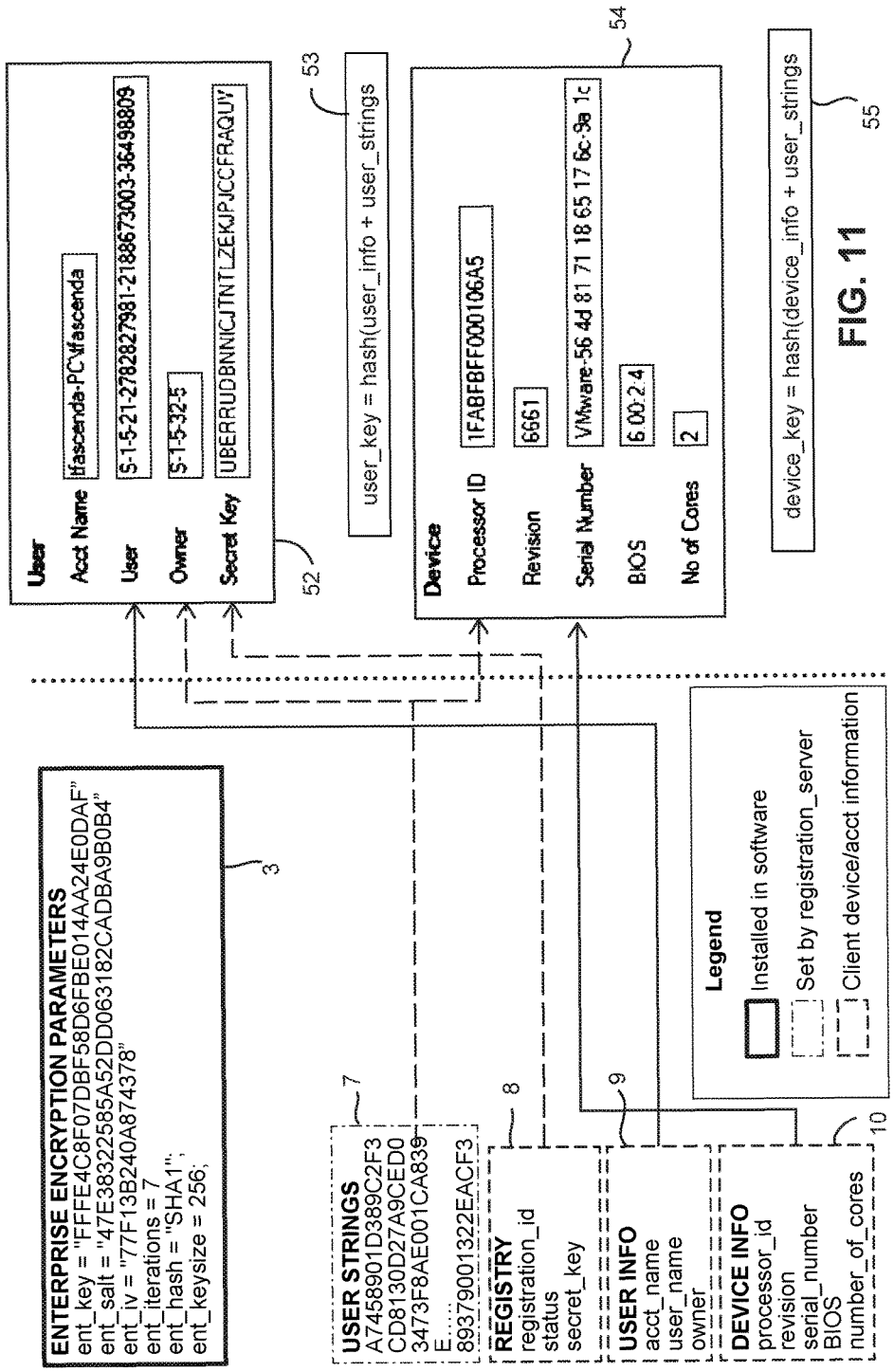
FIG. 11 illustrates the deriving of the user key (51) using account-specific information (9, 52) and selected user_strings (7).

As seen in FIG. 11, the next step after the one-time parameters are selected is to derive the user_key (53) and the device_key (55). The user_key (53) is derived using a custom enterprise algorithm which can vary by enterprise and be as simple as a hash of selected user information from the User Info (9) and specific user strings from the User Strings (7). An example of such an algorithm could be:

user_key=hash (acct_name+user_string[01]+owner+
"/"+user_string[03]+user_string[07])

A graphical representation of this is (53). Note the use of the specific user_strings. The user_key is not just a concatenation of User Info but can be a complex concatenation of selected user information along with selected user strings installed by the server.

Similarly, the device_key (55) is computed using a hash of selected Device Info (10) along with selected User Strings (7).

Both the device_key and user_key are computed using account and device-specific information which is assumed to not change appreciably over time hashed with selected randomly generated User Strings as downloaded from the Registration Server.

Figure 12:
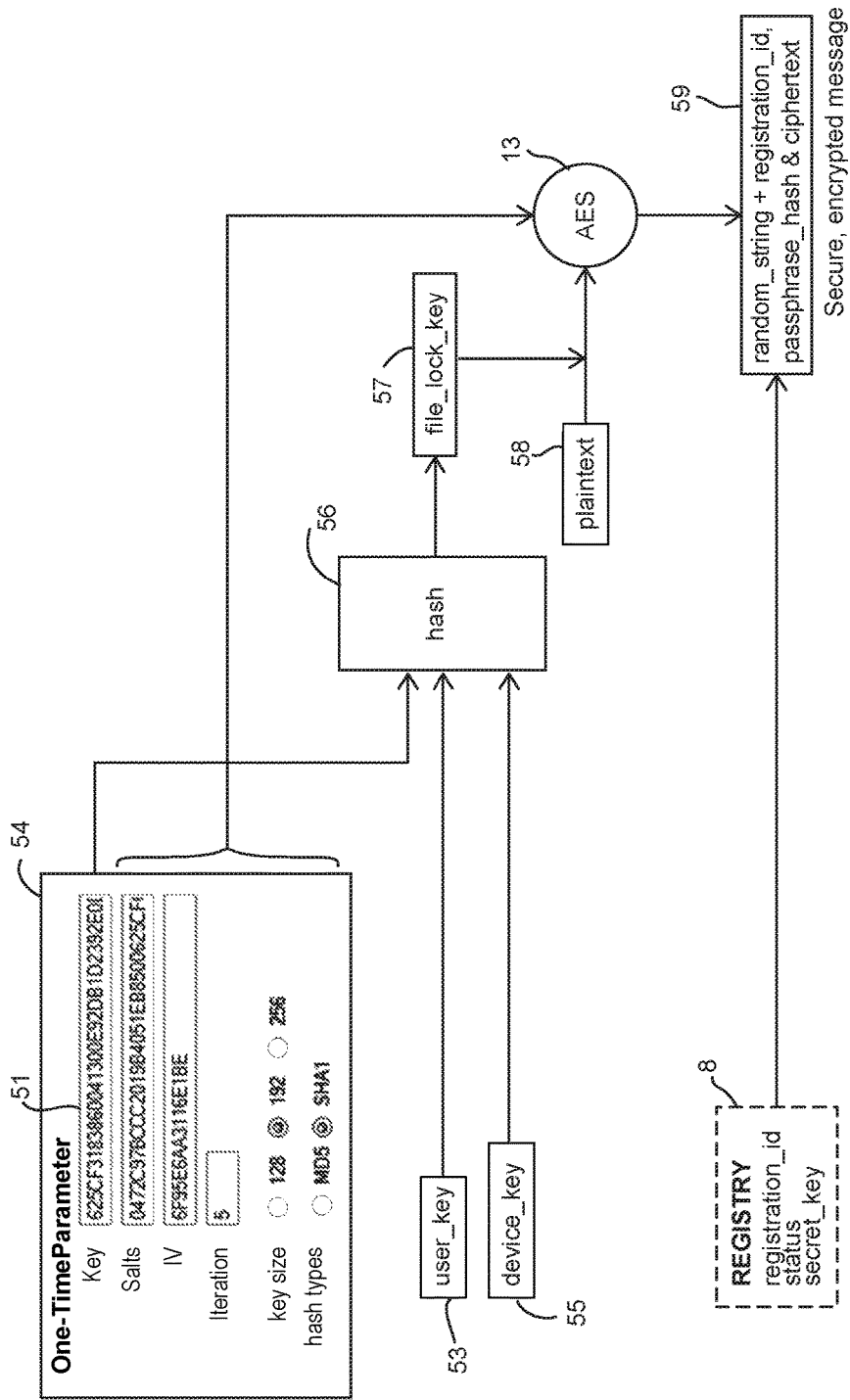
FIG. 12 illustrates the final step in the process of deriving an encryption key (57) from an initial set of widely distributed parameters.

The file_lock_key (57) is the actual key used to encrypt a specific message or document. It is derived as shown in FIG. 12 by hashing (56) together the user_key (53), device_key (55) and one_time_key (51) selected from the Parameter Table (54).

The file_lock_key (57) along with the other one-time encryption parameters (54) are used to encrypt (13) plaintext data (58) resulting in ciphertext (59) representing the secured message or document. The ciphertext is prepended with the random_string to enable the calculation of the necessary parameters for decrypting the message or document on the receiving end.

Decrypting a Message or Document

The process of decrypting a message or document is the reverse of the process of encrypting a message or document.

On receipt of the secure, encrypted message (59) as shown in FIG. 12, the message is broken up into its principal components: (a) the random_string, (b) the reg_id_r, (c) passphrase_hash and (d) the ciphertext.

The passphras_hash (59c) is used to select from the list of available passphrases selecting the passphrase whose hash matches. That passphrase is used to generate the Parameter Table (60). The random_string (59a) is used to select one-time parameters (63) from the Parameter Table ((60).

Figure 13:
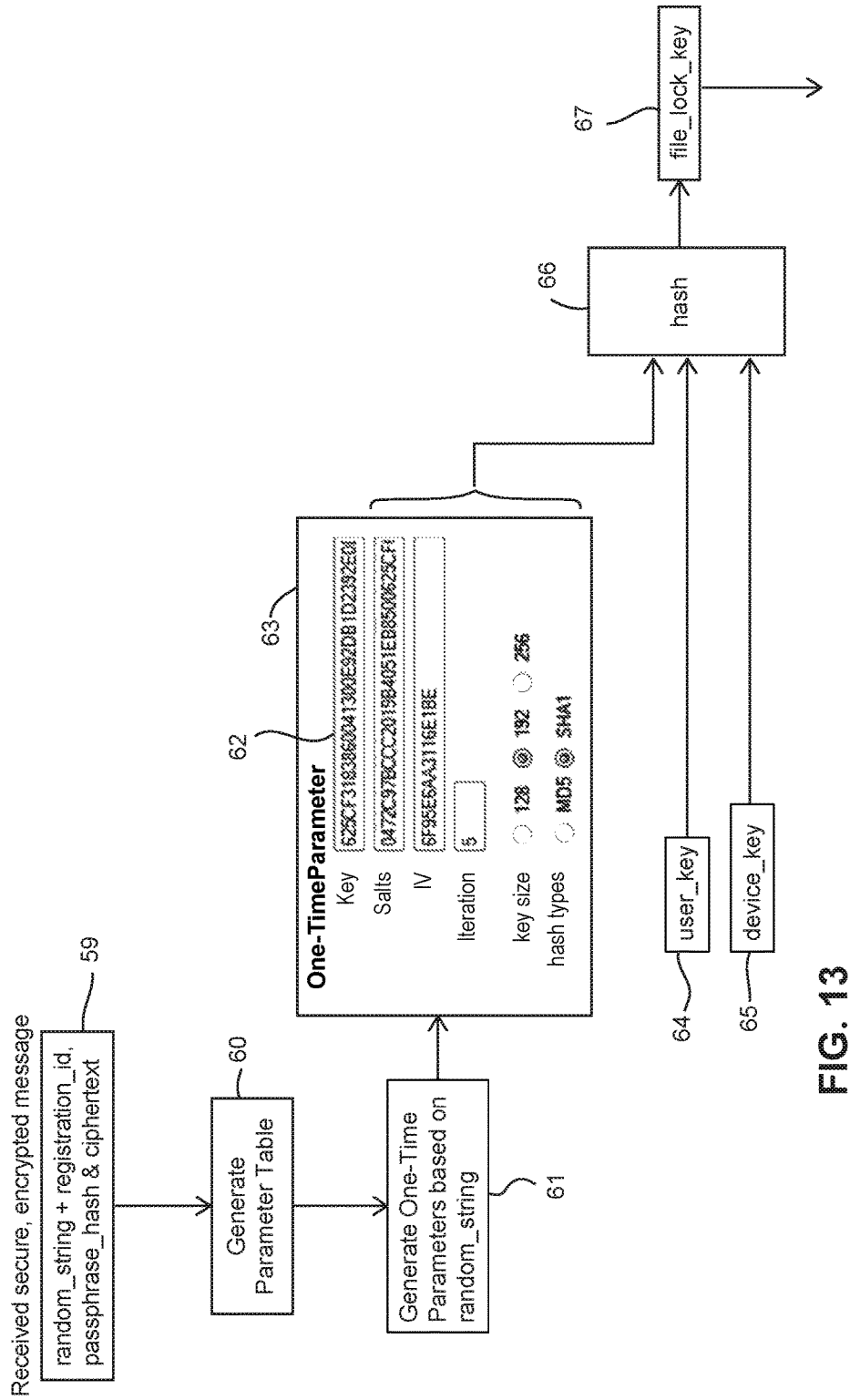
FIG. 13 illustrates the reverse process on the receiving side of a secure transaction.

As shown in FIG. 13, the receive client module then computes the user_key (64) and device_key (65) in an identical fashion to that used on the sending side. The preliminary file_lock_key (67) is derived from a hash of the one-time parameters (63), user_key (64) and device_key (65).

Figure 14:
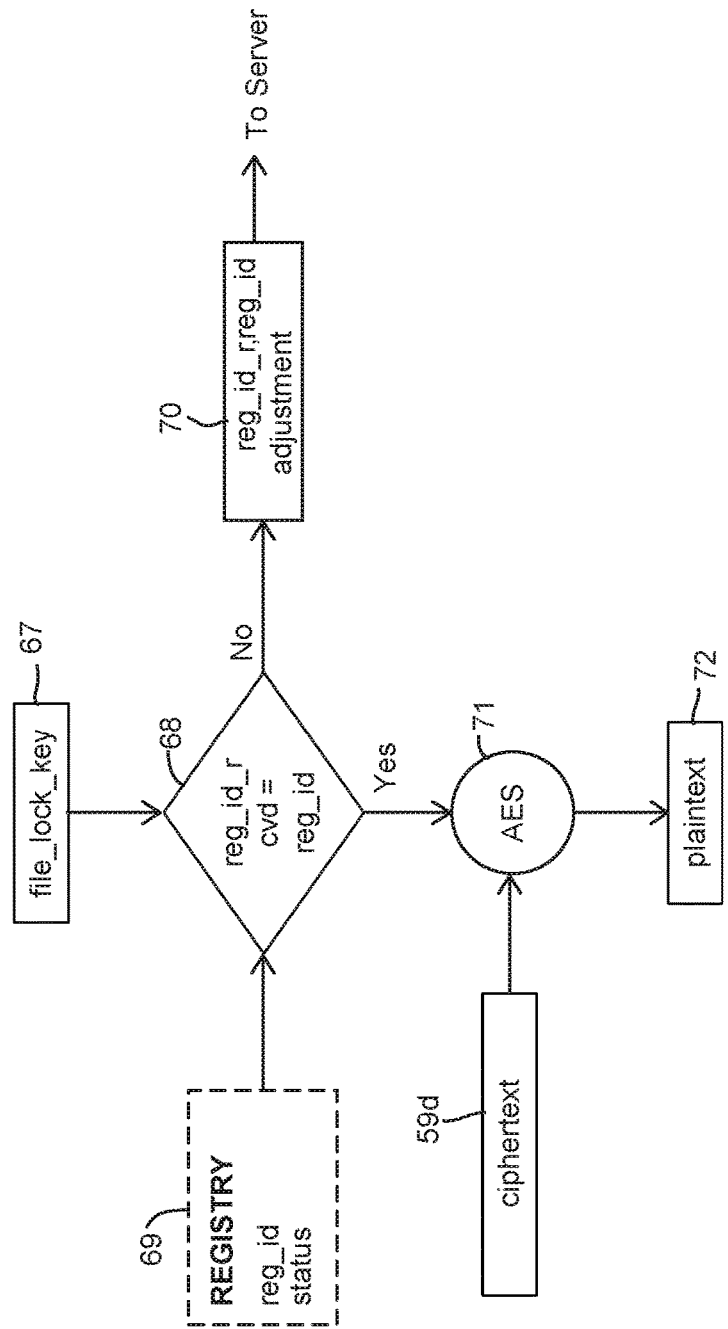
FIG. 14 illustrates conditional branch based on received_id and registration_id.

As shown in FIG. 14, the receive client module now compares the reg_id_r (59b) with its own unique reg_id (69). If there is a match the AES algorithm (71) processes the plaintext (72) from the ciphertext received (59d).

If there is no match between the reg_id_r and the internal reg_id of the client module, the client module sends an "adjustment request" (70) to the enterprise server. The adjustment request (70) contains both the reg_id_r (59b) and the embedded reg_id (69).

Figure 15:
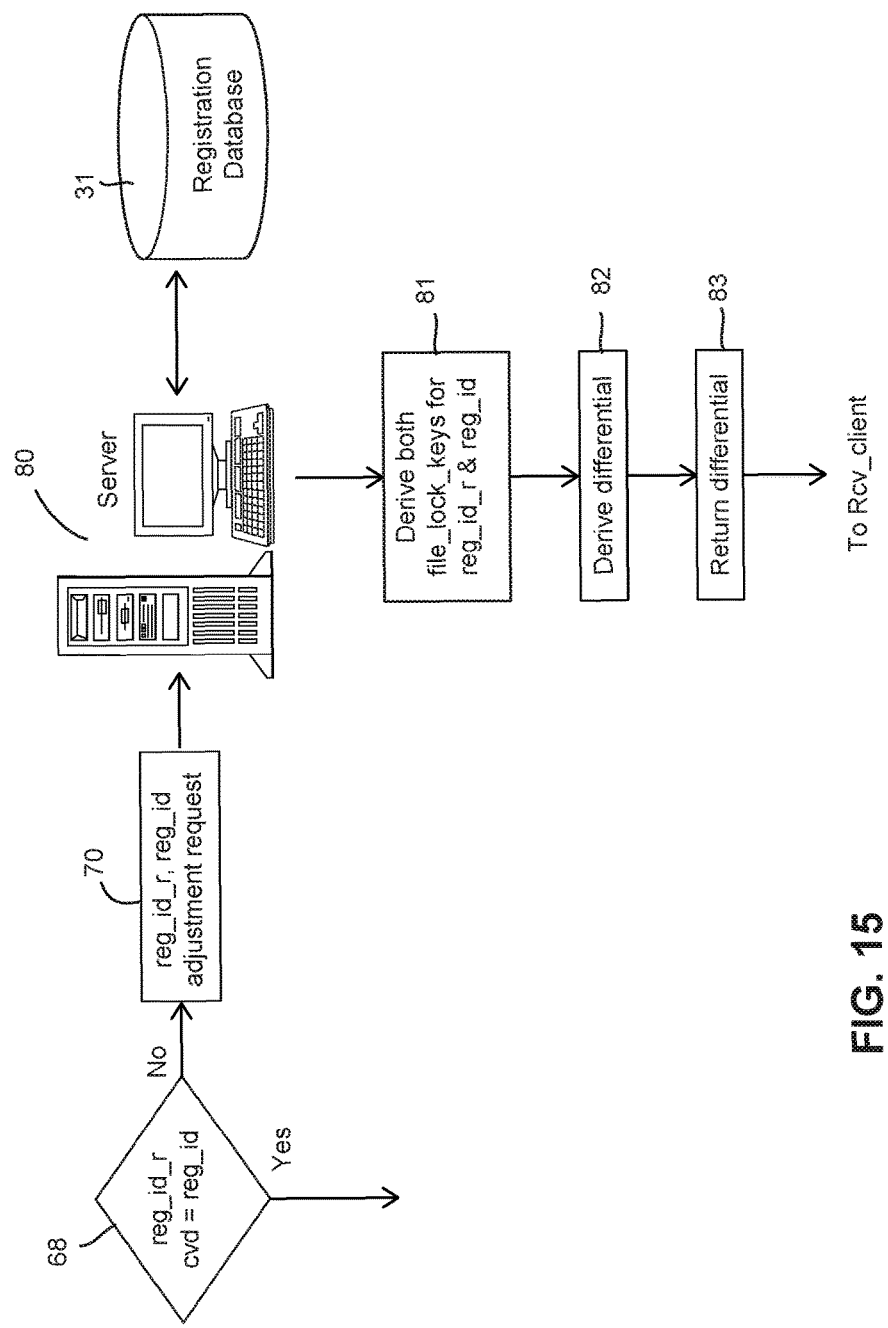
FIG. 15 illustrates server-side processing of differential registration ids.
Figure 16:
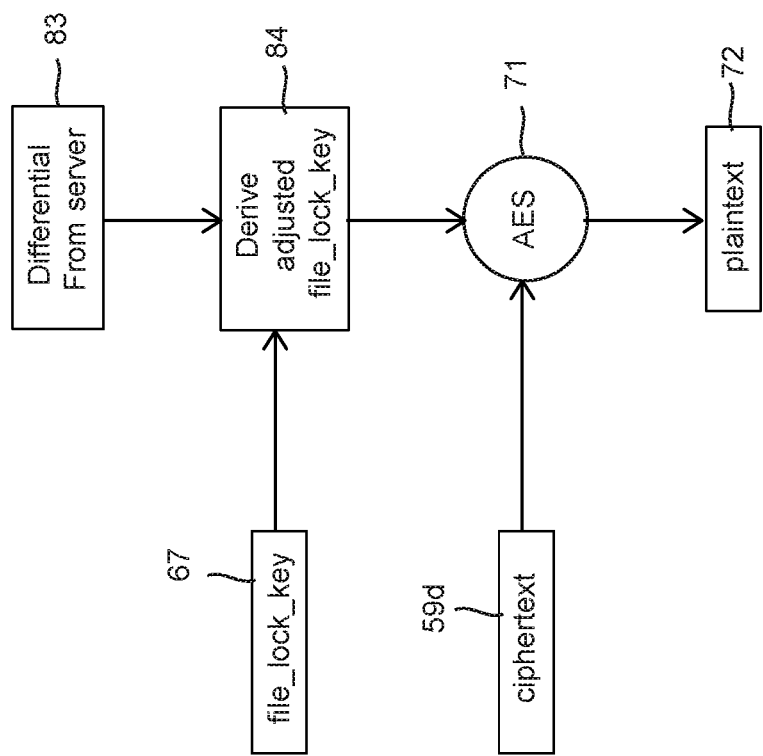
FIG. 16 illustrates deriving adjusted file_lock_key.

At the enterprise server site, as shown in FIG. 15, the adjustment request (70) is received by the server (80). The server derives the file_lock_key as would have been derived by the sending client_module and the file_lock_key as should have been derived from the receiving client_module (81). The differential (82) between the two file_lock_keys is derived by ordinary means and is returned (83) to the requesting client module.

The client_module on receipt of the differential (83) from the server derives the adjusted file_lock_key (84) and using the encryption/decryption algorithm (71) is able to extract the paintext (72) from the received ciphertext (59d).

Should two enterprises merge, each containing separate passphrases and base encryption parameters, each client module of both enterprises would be provided with a new set of passphrases and base encryption parameters providing for consistent operation in a forward-looking basis.

Summary of Parameters Involved in the Computation

The final step in the encryption process is to encrypt plaintext using encryption parameters (54) and file_lock_key (57).

The file_lock_key (57) is a calculation and can be as simple as a hash of the one_time_key (51), user_key (53) and device_key (55).

The encryption parameters (54) are selected from a Parameter Table (49) whose elements are generated from a random substring (48a).

The Parameter Table (49) is generated from a randomly chosen passphrase (downloaded from the Registration Server) which is used in a process to generate 26 entries for each parameter type. The calculation of each initial parameter involves the Enterprise Encryption Parameters (3) embedded in the software. Subsequent table entries are made by hashing the previous entry and the constant (sdata) (42).

The device_key (55) is derived by hashing selected Device Info (10) along with specified User Strings (7).

The user_key (53) is derived by hashing selected User Info (9) along with specified User Strings (7).

A non-limiting example feature is therefore shown to comprise a widely distributed and diverse set of parameters used to construct various components from randomly selected elements to finally compute a file_lock_key. The process is straightforward in one direction and impossibly difficult in the reverse direction.

As random numbers are utilized throughout the process to select parameters, the file_lock_key has an extremely high likelihood of never being duplicated in subsequent encryptions.

The description contained herein is a non-limiting exemplary embodiment such that alternative cryptographic algorithms, tables, parameters, etc., can be used. For example, the set of encryption parameters chosen for encrypting a message or document will be based on more than a traditional two-party exchange and be derived in part from information specific to a particular user and user's device.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:
1. In a distributed computing environment, a method for determining a widely dispersed set of digital information, comprising:
   querying a first computational environment to discover a first set of widely dispersed digital information;
   obtaining at least a second set of widely dispersed digital information discovered by at least a second computational environment;

combining the at least two subsets of the widely dispersed digital information by at least one of the computational environments;

deriving cryptographic material from a combination of the first widely dispersed digital information set and the second widely dispersed digital information set;

using the derived cryptographic material as parameters to encrypt a message; and communicating the encrypted message and additional differential information to enable a further end point to enables an at least one other computational environment to derive the same cryptographic material enabling decryption of the encrypted message without communicating or revealing the derived cryptographic material.

2. The method of claim 1 wherein the cryptographic material is generated using a set of widely dispersed parameters some of which are tied to a user's account and some of which are tied to a user's device.

3. The method of claim 1 wherein the cryptographic material is derived from a set of parameters from multiple tables based on a randomly generated string such that it cannot be known beforehand which set of widely dispersed parameters might be chosen per use in deriving the cryptographic material.

4. The method of claim 1 further comprising using the cryptographic material to generate a symmetric key.

5. The method of claim 1 further comprising using the cryptographic material to generate an asymmetric key.

6. The method of claim 1 further including using a set of passphrases to derive the cryptographic material.

7. The method of claim 1 further including detecting changes in registered parameters and automatically reregistering a current set of parameters with a registration server thus allowing messages previously encrypted to previous parameters to be addressed by the server along with new messages based on new parameters.

8. The method of claim 1 further including:
randomly selecting a passphrase;
constructing a parameter table containing a list of cryptographic keys, a list of encryption initialization vectors, salts, a list of hash types, a list of iteration counts and a list of key sizes; and
filling entries in the table by generating a constant obtained by hashing passphrase, and subsequently hashing a previous entry with the constant.

9. The method of claim 1 further including generating a random string used as a pointer into a parameter table or other data structure.

10. The method of claim 1 further including using one time parameters used only for generating a cryptographic key for one or a small number of messages.

11. The method of claim 1 wherein the steps are performed by:
an encryptor;
a decryptor;
a widely dispersed parameter data structure containing parameters that are derived from a user-specific computing environment;
a key generator that generates at least one cryptographic key from the parameter set; and
a controller that controls the encryptor and/or decryptor transform between plaintext and ciphertext using the generated cryptographic key.

12. In a distributed computing environment, a method for determining a widely dispersed set of digital information,
wherein the widely dispersed set of digital information is determined by at least two computational environments,
the widely dispersed set of digital information is combined by at least one of the computational environments,
the combined widely dispersed set of digital information is used by the at least one computational environment as input parameters to a derivation process which generates cryptographic material used for an encrypting process of additional input data;
the method comprising:
querying a first of the at least two computational environment to discover a subset of the widely dispersed digital information;
generating at least one other subset of widely dispersed digital information by the at least one other computational environment;
communicating between the at least one other and the first computational environments the at least one other subset of widely dispersed digital information;
combining the at least two subsets of the widely dispersed digital information by at least one of the computational environments;
using the combined set of widely dispersed digital information as input to the cryptographic material derivation process;
using the derived cryptographic material as parameters to the encryption process;
the encryption process produces encrypted digital data from the additional input data,
wherein the method allows for the communication of the encrypted digital data and additional differential information that enables an at least one other computational environment to derive the same cryptographic material enabling the decryption of the encrypted digital information without ever exchanging or revealing the derived cryptographic material.

13. A distributed computing system for determining a widely dispersed set of digital information, the system comprising:
a first computational environment;
a second computation environment different from the first computational environment;
the first and second computational environments being configured to determine the widely dispersed set of digital information,
at least one of the first and second computational environments combining the widely dispersed set of digital information,
the at least one of the first and second computational environments using the combined widely dispersed set of digital information as input parameters to a derivation process which generates cryptographic material used for an encrypting process of additional input data;
at least one processor that queries the first computational environment to discover a first subset of the widely dispersed digital information;
at least one further processor that queries the second computational environment to discover at least a further subset of widely dispersed digital information;
at least one communication device that communicates the at least one further subset of widely dispersed digital information between the first and second computational environments;

at least one of said processors being further configured to combine the first subset and the at least one further subset of the widely dispersed digital information; and at least one of the first sand second computational environments using the combined set of widely dispersed digital information as input to a cryptographic material derivation process, using the derived cryptographic material as parameters to an encryption process that produces encrypted digital data from additional input data, the at least one communication device enabling communication of the encrypted digital data and additional differential information that enables an at least one other computational environment to derive the same cryptographic material enabling the decryption of the encrypted digital information without ever exchanging or revealing the derived cryptographic material.

14. The method of claim 1 wherein the digital information comprises binary data.

15. The method of claim 12 wherein the digital information comprises binary data.

16. The system of claim 13 wherein the digital information comprises binary data.

* * * * *